Jan. 13, 1948.　　　LE CONIE STILES　　　2,434,339
PRODUCTION OF COFFEE CAKES
Filed March 22, 1944　　　4 Sheets-Sheet 3

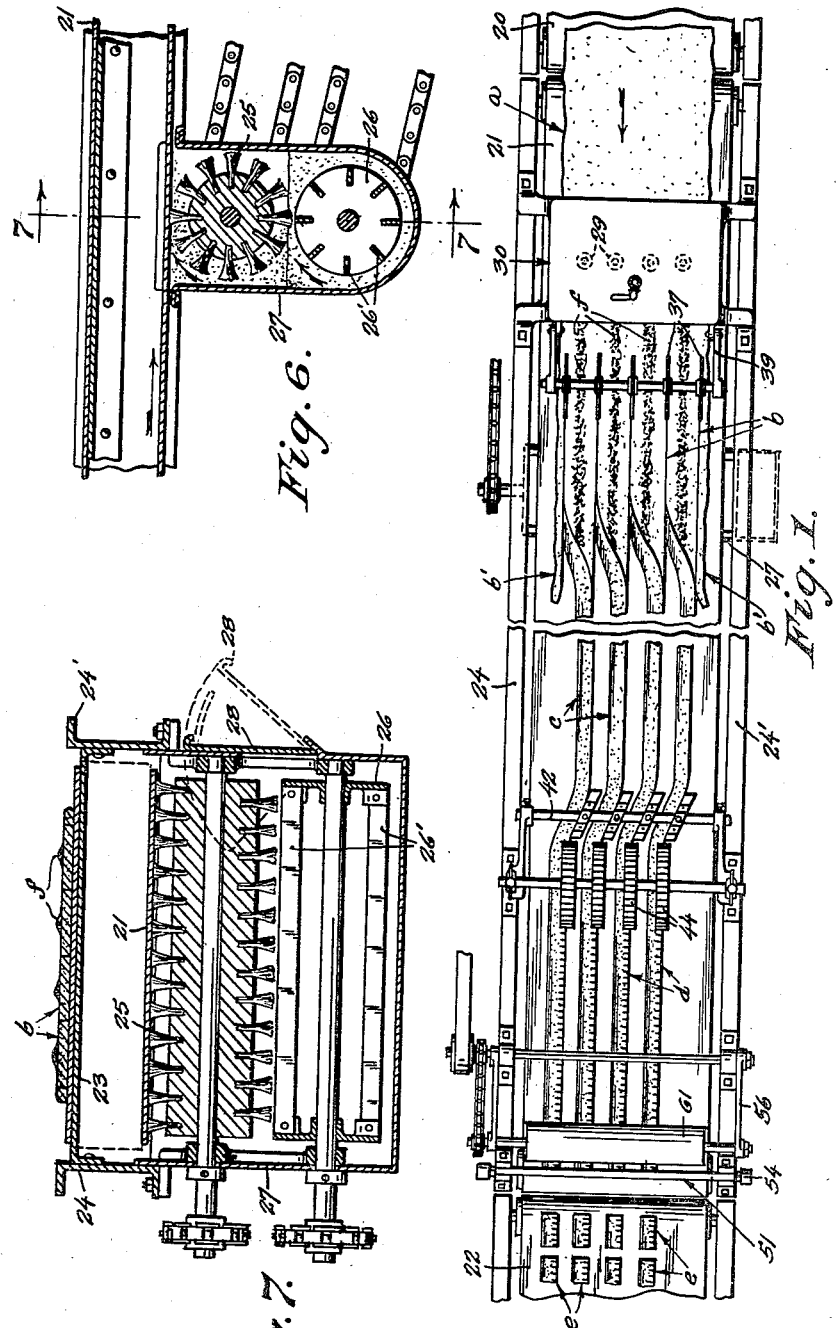

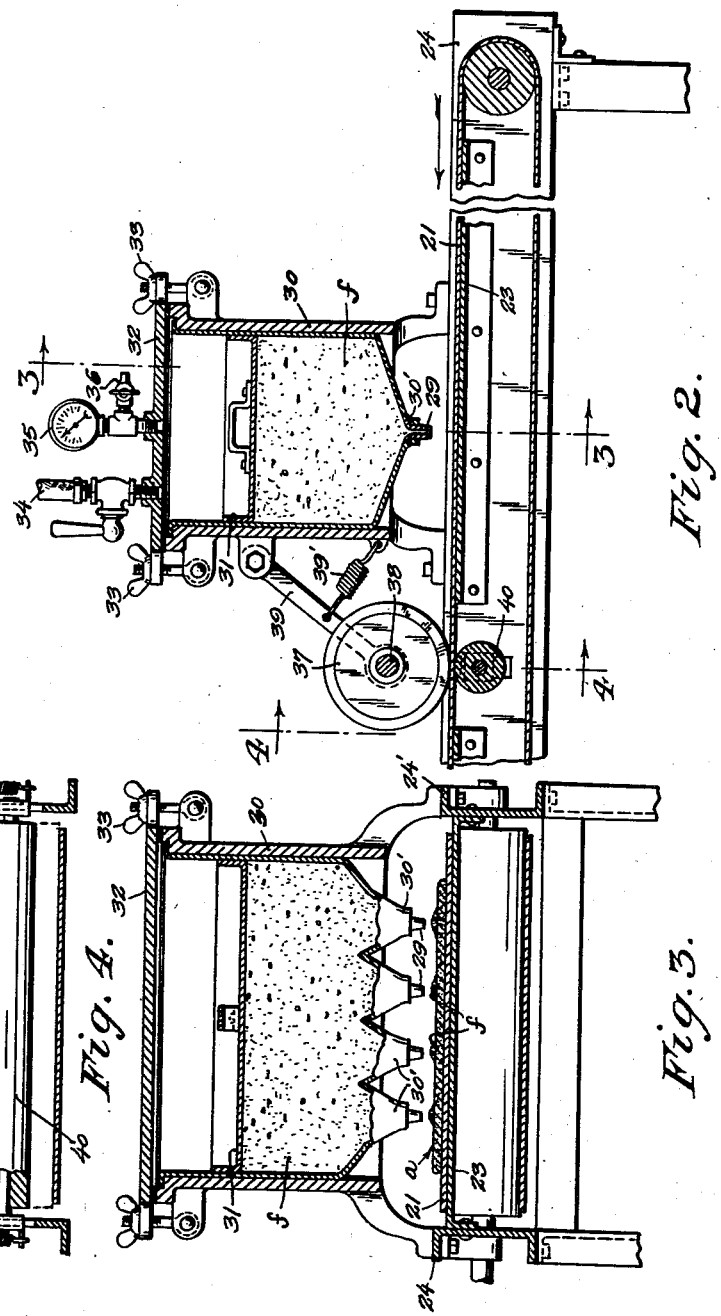
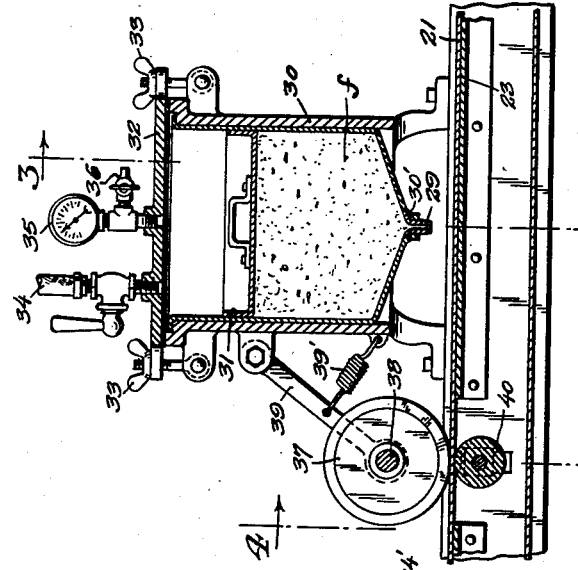
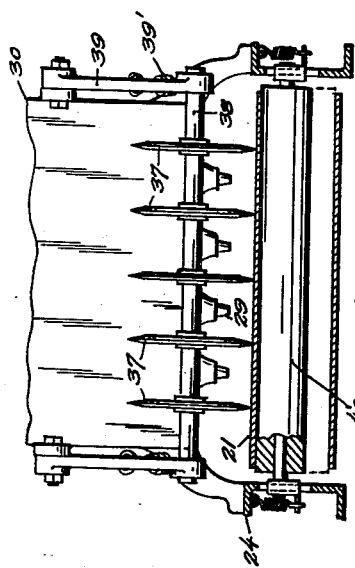

INVENTOR.
LeConie Stiles
BY
atty

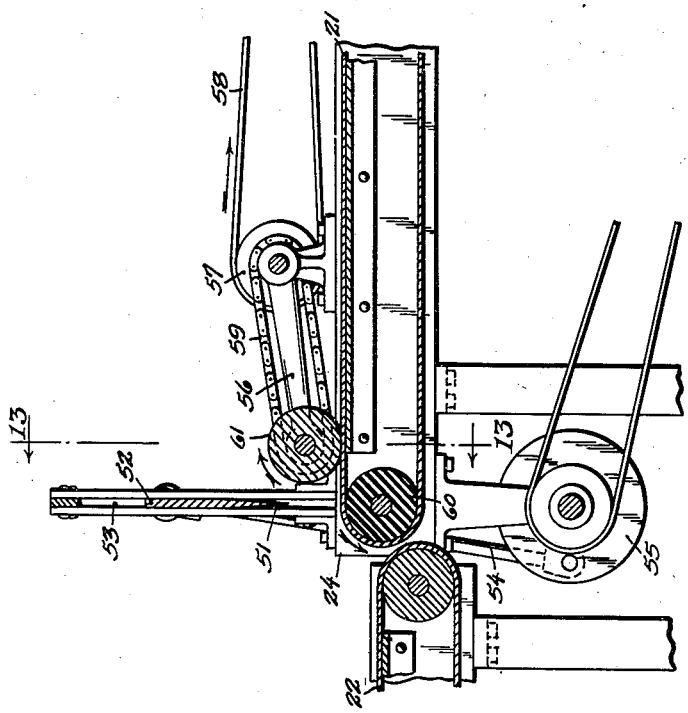
Fig. 12.
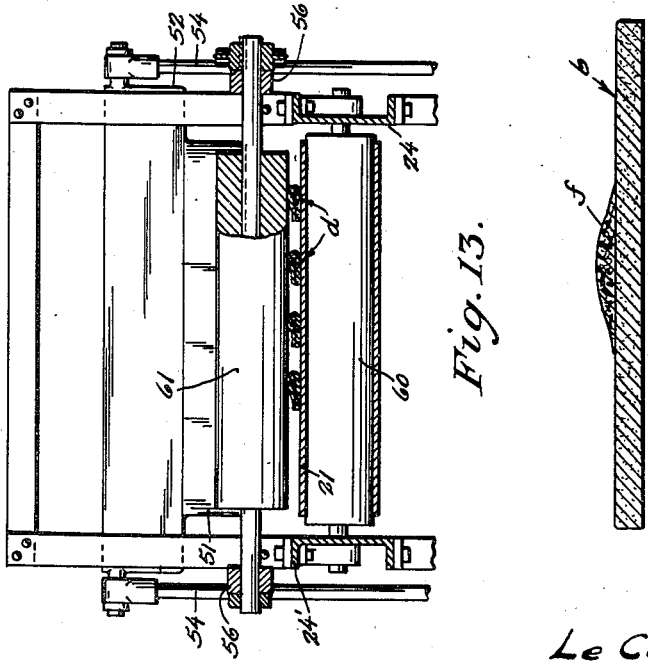
Fig. 13.
Fig. 14.
Fig. 15.
INVENTOR.
Le Conie Stiles Patented Jan. 13, 1948

2,434,339

UNITED STATES PATENT OFFICE 2,434,339

PRODUCTION OF COFFEE CAKES

Le Conie Stiles, Seattle, Wash.

Application March 22, 1944, Serial No. 527,583

9 Claims. (Cl. 107—21)

This invention relates to the production of coffee cakes, and especially the type of coffee cake commonly referred to as a "bear-claw," namely a product of the bakery art in which sheeted dough is applied as a wrapper about a filling of fruit or the like.

The present invention aims to mechanize, or largely mechanize, steps which have been heretofore performed by hand, and which is to say the steps of applying the filling, as a topping, upon an elongated strip or ribbon of sheeted dough which is thereupon folded over the topping, following which the top and bottom edges which have been brought together at the open side of the folded dough body are notched to give the claw-like appearance characteristic of this particular bakery product, finally cutting the dough body transversely at spaced intervals of the length to describe the individual "bear-claws."

The invention additionally aims to provide a method and machine of especially high production capacity attained through the instrumentality of processing multiple lines of "bear-claws" simultaneously.

Further objects and advantages, with the foregoing, will become apparent in the course of the following description and claims.

Clarity in an understanding of the invention will, it is believed, be advanced by here cursorily setting forth the nature of the various elements of my machine as I have engineered the same to carry the process into effect. Such machine is essentially characterized by the provision of a conveyor, or conveyors, which brings the dough body under the influence of relatively stationary mechanism operating by successive action to accomplish the ends in view. Included in this mechanism and occupying a position at the head end of the conveyor is a press containing the fruit-mix and discharging, through extrusion nozzles, plural streams of the fruit substance onto the dough body as the latter passes therebelow, the travelling dough being in the form of a wide sheet and the deposited fruit-mix, as a topping, being applied thereon in separated parallel lines spaced equidistantly at intervals of the width. Proceeding, the dough is made subject to the action of a set of cutting wheels or discs which slit the sheet longitudinally intermediate the lines of the applied topping mix, and the produced multiple strips of dough—identical as to width—are each thereupon folded, a step which I perform without interrupting the dough travel by bringing the back edge of each strip up and over the applied topping. The strips, after folding, are caused to be guidably fed under pressure wheels arranged to act only upon the open-side edge of the fruit-enveloping dough body, and which notch-cut the edges to give to the emerging work the bordering indentations customarily associated with "bear-claws." Thence conveyed to a cutter, the several claw-edge strips are sliced transversely at spaced intervals of the length, being thereafter coated with "streusel," and then baked. The "streusel" treatment is no part of the present invention, although a machine for this purpose peculiarly lending itself to usage as a follow-up to the mechanism of the instant disclosure is illustrated and described in my co-pending application, Patent Number 2,345,637 of April 4, 1944. The "bear-claws" which I produce are turned out in a fraction of the time required when using hand labor, and are of substantial pattern-uniformity, with the additional advantage of producing a more sanitary product.

The invention consists in the new method of producing "bear-claws," and in the novel construction, adaptation and combination of parts hereinafter described and claimed, for performing said method.

In the accompanying drawings wherein I illustrate the now preferred embodiment of my machine:

Figure 1 is a fragmentary top plan view, and having a dough sheet portrayed therewith in its progressive stages of treatment.

Fig. 2 is a fragmentary longitudinal vertical section taken to an enlarged scale, detailing the extrusion press and the slitting wheels.

Fig. 3 is a transverse vertical section on line 3—3 of Fig. 2; and Fig. 4 is a transverse vertical section on line 4—4 of Fig. 2, the former figure embodying a showing of the dough sheet.

Fig. 5 is a still further enlarged fragmentary vertical section detailing one of the extrusion nozzles of the press, particularly to illustrate the removable nature of the nozzles for varying the capacity of the extrusion opening.

Fig. 6 is a fragmentary longitudinal vertical section using a scale corresponding to that of Figs. 2, 3 and 4 and detailing the belt-flouring device which occupies a position below and is functional to the return run of the conveyor belt.

Fig. 7 is a transverse vertical section on line 7—7 of Fig. 6, and illustrating the dough body on the upper run of the belt.

Figure 8:
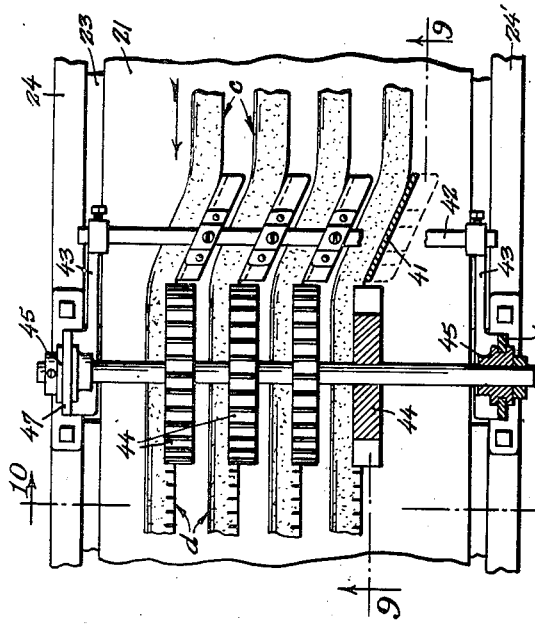

Fig. 8 is an enlarged fragmentary plan view with parts in section to detail the pressure members and their related guides, and indicating the dough bodies which are now in a folded condition as the same are fed through the pinch-crimping stage of the process, or which is to say guidably carried to bring the open sides of said folded dough bodies under the crimping influence of a respective pressure member.

Figure 9:
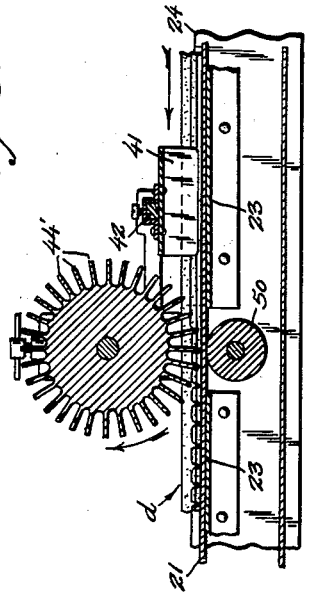
Figure 10:
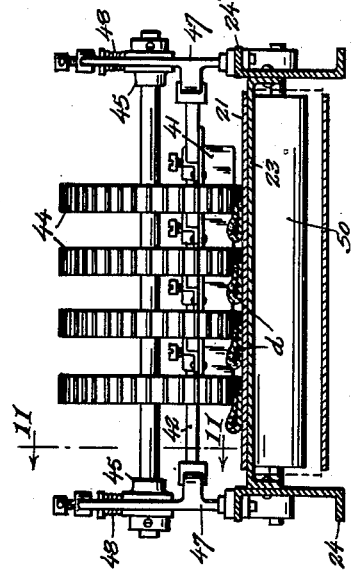

Fig. 9 is a longitudinal vertical section on line 9—9 of Fig. 8; and Fig. 10 is a transverse vertical section on line 10—10 of Fig. 8.

Figure 11:
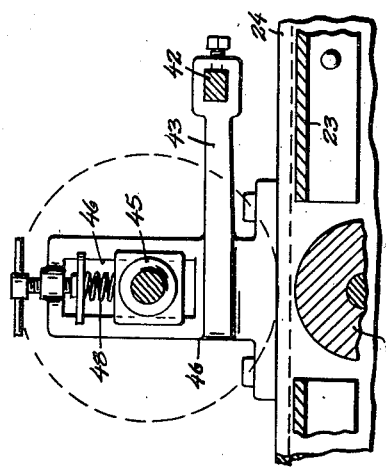

Fig. 11 is a fragmentary longitudinal vertical section taken to an enlarged scale on line 11—11 of Fig. 10, with the belt deleted.

Fig. 12 is a fragmentary longitudinal vertical section detailing the cutter mechanism which slices the dough strips transversely.

Fig. 13 is a transverse vertical section on line 13—13 of Fig. 12.

Fig. 14 is a transverse vertical section, enlarged, to illustrate one of the dough strips prior to folding the applied fruit-mix therein; and Fig. 15 is a transverse vertical section taken through the dough body following folding and crimping, or which could as well be a sectional view representing the finished product.

Referring to said drawings, the numerals 20, 21 and 22 represent a series of three belts of endless type supported by the usual live and idler rollers and driven in any suitable manner as, for example, by chain-and-sprocket (not shown). The present invention pertains especially to the second-named of these belts which I will hereinafter refer to as the processing belt, with the said belt 20 acting as a supply belt and serving to deliver a wide sheet of dough, as a, to the admission end of the processing belt, and the other belt 22 being disposed at the tail end of the processing belt and picking up the product of the process, namely "bear-claws" e, as the latter clear the delivery end of the processing belt. It is believed to be unnecessary to enter into any detailed description of the frame-work of the machine other than to point out that a bed-plate 23 is provided as a sustaining floor for the upper run of the processing belt, and which spans the opening between and connects with side members 24—24' which are or may be channel-irons.

There is applied upon the underside of the machine a flour-dusting device functional to the return run of the belt 21, and which comprises a rotary brush 25 which, with a subjacent cylindrical and revolving cage 26, is housed within a flour-containing bin 27, the arrangement being one in which the bin is charged through a gate 28 and the flour thrown into the path of the revolving bristles by the action of peripherally disposed rotor vanes 26' of the cage, the brush then sweeping the flour against the underside of the belt's return run. Both cage and brush, and as indicated by arrows in Fig. 6, are power-driven in a like direction and in correspondence with the directional travel of the belt. The applied flour is in consequence presented to the underside of the delivered dough body as an augmenting application to the flour present upon the latter as the dough body leaves the sheeting rollers (not shown) and is picked up by the delivery belt 20, replacing losses incident to the sheeting.

Now proceeding to describe the treatment given the body of sheeted dough as it is delivered from the belt 20 to the processing belt 21, the same is first caused to pass under a gang of extrusion nozzles 29, receiving therefrom toppings of a fruit-mix, as f, which is supplied from a bin 30 made subject to a suitable extrusion pressure as, for example, by a head of compressed air, the nozzles lying at spaced intervals of the dough width. The plunger for the press is denoted by 31, and fitting over and sealing the pressure chamber which lies above this plunger is a cover 32 attached to the bin by clamps 33 and carrying the valved delivery end of a hose 34 leading from a suitable source of pressure air (not shown), the cover also carrying a pressure gauge 35 and, if desired, an exhaust cock 36 for "blowing" the pressure chamber, the latter being, however, unnecessary from the fact that a comparatively low pressure of 15# suffices as a suitable air head and the cover can be thus safely removed without a previous "blowing." Reverting to the nozzles, it will be understood that the fruit mixes employed necessarily vary in consistency to meet the demands for various types of fillings, and as a means to control the feed in meeting these changing consistencies I have formed the nozzles such that the same can be readily replaced, producing the same with flanged necks which shoulder against the end walls of mating recesses provided at the lower discharge ends of sump-like outlets 30'.

Progressing beyond said extrusion nozzles, the dough body is thereupon slit longitudinally along the side margins and between the surface lines of the applied fruit-mix by a gang of circular cutters 37, the cutters being mounted upon a transverse shaft 38 freely journaled in the free ends of swinging arms 39 and being yieldingly caused to bear against the belt by springs 39'. The edges of these cutters are comparatively dull. As a means of obviating undue frictional drag at this point, between the moving belt and the stationary floor 23, and as would be the case were the belt to be pressed by the cutters against the floor, I introduce an idler roll 40 in lieu of the floor, cutting the latter away immediately below the point of the slitting operation.

Now having been divided into identical-width strips, as b, the next step in the method is to fold the dough over the applied fruit-mix and this is performed manually by an operator standing at the side of the machine and who is enabled to easily handle four, or even more, rows in the permitted time interval following slitting and before the folded bodies, as c, progress to and are conveyed through guide slots, the spacing between the slitting members and the guide slots being quite appreciable and the procedure of folding being one in which, taking the strips in turn, the back edge of the strip is picked up and drawn up and over the fruit-mix and thus presenting overlying edges where the back margin is brought over the front margin. The operator, in addition to folding, also clears the table of the edge trimmings indicated by b' and which are placed in a suitable receptacle for re-use in a later dough batch.

Forming the guide wall for each of the several slots which, as above stated, receive the folded dough bodies c is a diagonally disposed vertical plate 41 supported for lateral adjustment by a cross-rod 42, and supporting this rod at each side of the machine are hanger-arms 43. Coming into contact with the plates, the dough bodies are deflected laterally and, emerging from the slots, occupy positions predeterminately related to a respective one of a number of crimping wheels 44 carried upon a common axle and given a free-running journal at each side of the machine in bearing boxes 45, the bearing boxes being arranged for vertical sliding movement in ways 46 of a frame-mounted block 47. Springs 48, adjustable as to their pressure load, act upon the bearing boxes to urge the same downwardly, thus spring-loading the wheels and causing the same to perform their crimping office upon the moving dough bodies, pinching only the open-side edges of the latter. As can be best seen from an inspection of Figs. 8 and 9, the action of the crimping wheels is obtained from a series of circumferentially spaced radial teeth 44' which are blunt on the ends and which, in fact, accomplish more a cutting than a crimping action, actually passing through the dough and producing open slots or notches along the side edge of the folded dough body. Being thus caused to penetrate through the dough and track directly upon the belt, it becomes possible to employ the latter as an effective means of driving the crimping wheels rather than resorting to a positive drive working upon the supporting axle therefor. For the same purpose previously set forth in connection with the description of the slitting knives 37, the processing belt as it passes below the crimping wheels is given walking support from an idler roll 50 occupying an opening which is cut in the floor 23.

Leaving the crimping wheels, the edge-notched dough bodies, as d, are caused to be sliced at spaced intervals of the length by a transversely extending knife 51 supported for reciprocatory vertical movement by a cross-head 52 working in a slideway 53, connecting rods 54 driving the cross-head from a crank-disk 55, one at each side of the machine. The knife, in the performance of its cutting office, is caused to work against the tail end of the belt as the latter passes about the tail roller 60, and as a means of protecting the belt against cutting, the roller is produced from a comparatively soft rubber or other readily compressible material to permit the same to "give" while supplying sufficient foundation support to enable the knife to pass through the dough. The knife, in cutting through such dough, squeezes the top and bottom layers together and, a moist edge having been exposed by the cutting, the end of the dough body is closed—by coherence—to seal the fruit-mix within. There is this to consider, however, and that is a tendency, as the knife moves upwardly following a cutting action, for the moist frontal edges of the conveyed dough bodies to cling thereto. As an effective means for resisting this tendency, there is provided a live roller, as 61, arranged to bear upon the dough bodies d at a point immediately adjacent the cutting plane of the knife and which receives a swinging support from hinge-arms 56, the drive to the roller being indicated as comprising a pulley 57 driven from a belt 58 and in turn driving a chain 59, the pulley being co-axial with the swinging axis of the roller.

It should be here pointed out that, desirably although not necessarily, an arrangement of two belts such as I illustrate and describe in my pending application hereinbefore identified is employed to convey the work through the processing steps of the invention, and which is to say that, instead of the single belt 21 which, for simplicity in illustration, has been shown, the machine as I apply the same to the process uses two belts, one carrying the work through and beyond the edge-notching stage, and the other then picking up the dough bodies d and carrying the same through the final cutting stage. The particular characteristic of this last mentioned belt is an accommodation to an interruption of travel as the knife comes into contact with the belt at the lower limit of its reciprocatory travel, thus momentarily stopping the belt, thereafter briefly accelerating its speed to pick up the lost travel incident to the interruption. The arrangement is detailed in my said co-pending application, and will be clearly comprehended by an inspection thereof.

Upon leaving the cutting stage, the produced "bear-claws" are deposited upon the said tail belt 22 which is disposed to have its admission end occupy a plane somewhat below the plane of the processing belt or belts, and by this tail belt are conveyed to and deposited upon a "streusel" table or, in instances where it may be desired to eliminate this latter treatment, direct to the baking pans. The feature of disposing the tail belt below the processing belt is of advantage in that it permits the tail belt to partially underlie the processing belt, consequently reducing the span of the jump-space between the two belts, and is found to obviate any tendency for the "bear-claws" to hang-up following cutting.

The method of the invention, and the machine for practicing the same, are thought to be clear from the foregoing. It will be apparent that modifications may be resorted to without departing from the spirit, and in this connection it may be mentioned that a mechanizing of the manual operation which I have described, namely folding the dough strips in advance of their introduction to the guide slots, is entirely feasible, a means for this purpose which I have experimented with and found to be reasonably efficient comprising a series of roller-mounted pins, quite small as to diameter, disposed to collectively describe a half-circle spiral walk, one edge of the dough strip being brought onto this walk-way and in the course of its travel turned up and over the other edge which continues to be supported upon the belt. No effort has as yet been made to apply a mechanical turn-over in the commercially used embodiment of the machine, primarily from the fact that manual folding is readily accomplished and the individual doing such is also enabled to inspect the product as it passes before him for detection of any variation in the feed of the fruit-mix.

It should, perhaps, be made clear that the degree to which the folded dough bodies c are deflected by the diagonal plates 41 is but very little, and I have exaggerated this movement in the drawings as a means of giving significance to the guiding action, it being necessary in actual practice only that the folded dough have its open-side edges brush against the guide plate in order to assure correlation with the notching wheels 44 upon emerging from the slots.

What I claim is:

1. In a machine for the production of baker's "bear-claws," and in combination with a conveyor arranged and adapted to carry an elongated strip of dough which has been folded as a wrapper about a filling of fruit-mix: a notching wheel provided about its periphery with circumferentially spaced radial teeth and journaled for free rotary movement about a transverse axis to have the teeth bear upon the conveyor and receive a friction drive therefrom; yielding means for depressing said wheel against the conveyor and means for guiding the conveyed dough body to the notching wheel to have the latter marginally notch the body for describing "claws" along the open-side edge thereof.

2. A machine according to claim 1, the conveyor comprising an endless belt carrying the dough body upon the upper run thereof, and having a stationary sustaining bed-plate underlying said upper run of the belt to give support to the conveyed dough body in its approach to and its movement beyond the notching wheel while being interrupted, however, immediately below the point of the wheel's applied pressure to present an open gap; and a roller received in said open gap and journaled for free-running movement about a transverse axis to operate as a "walking" support for the belt in its travel below the wheel.

3. The combination with an endless conveyor belt, and with means performing a processing office with respect to articles carried on the upper run of the conveyor and operating, in the performance of said office, to exert pressure upon the belt: a stationary bed-plate underlying said upper run of the belt and giving support to the conveyed article as the same is caused to approach and move beyond the processing stage while being cut away to present an open gap immediately below the said point of applied pressure; and a roller disposed transversely of the belt within said gap to operate as a "walking" support for the belt in its travel below the processing means.

4. Means arranged to operate upon the lower return run of an endless conveyor belt for flouring the latter and comprising, in combination with the belt: a brush mounted in touching relation to the undersurface of said return run of the belt and journaled for rotary movement about an axis which is generally transverse to the belt and parallels the plane occupied by the return run thereof; a cylindrical cage mounted below and journaled for rotary movement about an axis paralleling that of the brush, and provided about its periphery with a series of circumferentially spaced vanes; a bin forming a housing for the brush and the cake and adapted to be charged with flour to a level above the lower sweep of the vanes; and means for driving said brush and cage in like directions of rotary travel and such that the belt-contacting bristles brush the belt in a direction corresponding to the directional travel of the latter.

5. Mechanism for cutting an elongated body of dough transversely at spaced intervals of the length as the dough body moves in unison with a supporting conveyor belt and comprising, in combination with the belt, and with drive and idler rollers supporting the same of which the idler roller is of a readily compressible nature: a transversely extending knife supported for reciprocatory vertical movement above the idler roller and at the lower extreme of its reciprocatory travel finding contact with the belt; means for powering the knife; a roller disposed transverse to the belt and caused to bear upon the conveyed dough body immediately adjacent the cutting plane of the knife; and means imparting a positive drive to said last-named roller for rotating the same in a direction and at a rim speed corresponding to the direction and travelling speed of the conveyed dough body.

6. Means arranged to operate upon the lower return run of an endless conveyor belt for flouring the latter and comprising, in combination with the belt: a brush mounted in touching relation to the undersurface of said return run of the belt and journaled for rotary movement about an axis which is generally transverse to the belt and parallels the plane occupied by the return run thereof; a cylindrical cage mounted below and journaled for rotary movement about an axis paralleling that of the brush, and provided about its periphery with a series of circumferentially spaced vanes; a bin forming a housing for the brush and a cage and adapted to be charged with flour to a level above the lower sweep of the vanes; and means for driving said brush and cage.

7. Mechanism for cutting an elongated body of dough transversely at spaced intervals of the length as the dough body moves in unison with a supporting conveyor belt and comprising, in combination with a driven endless belt, and with rollers supporting the same of which one said roller is of a readily compressible nature: a transversely extending knife supported for reciprocatory vertical movement above said compressible roller and at the lower extreme of its reciprocatory travel finding contact with the belt; means for powering the knife; a roller disposed transverse to the belt and caused to bear upon the conveyed dough body immediately adjacent the cutting plane of the knife; and means imparting a positive drive to said last-named roller for rotating the same in a direction and at a rim speed corresponding to the direction and travelling speed of the conveyed dough body.

8. Mechanism for cutting an elongated body of dough transversely at spaced intervals of the length as the dough body moves in unison with a supporting conveyor and comprising, in combination with a driven conveyor arranged to carry the dough body upon the upper surface thereof, and with means movable in a path at right angles to the directive travel of the conveyed dough body into and out of cutting engagement with the latter: a roller disposed transverse to the belt and caused to bear upon the conveyed dough body at a point immediately adjacent the cutting plane of the cutting means; and means imparting a positive drive to said roller for rotating the same in a direction and at a rim speed corresponding to the direction and travelling speed of the conveyed dough body.

9. Structure according to claim 5 in which the roller last recited is hingedly mounted for vertical swinging movement about an axis longitudinally offset from its axis of rotation, and acts by its own weight to yieldingly bear upon the conveyed dough body for resisting the tendency of the knife to lift the dough body as the knife moves upwardly following a cutting action.

LE CONIE STILES.

REFERENCES CITED

The following references are of record in the file of this patent:

UNITED STATES PATENTS

| Number | Name | Date |
|---|---|---|
| 356,450 | Coleman | Jan. 25, 1887 |
| 1,288,868 | Gabriel | Dec. 24, 1918 |
| 1,522,738 | Miller | Jan. 13, 1925 |
| 1,542,710 | Laskey | June 16, 1925 |
| 1,621,012 | Head et al. | Mar. 15, 1927 |
| 2,217,896 | Fonken | Oct. 15, 1940 |
| 2,252,934 | Lautmann | Aug. 19, 1941 |

FOREIGN PATENTS

| Number | Country | Date |
|---|---|---|
| 14,247 | Switzerland | May 4, 1897 |
| 79,999 | Austria | Feb. 10, 1920 |
| 123,102 | Germany | Aug. 27, 1901 |
| 343,469 | France | Oct. 7, 1904 |